(12) United States Patent
Peng et al.

(10) Patent No.: US 6,457,118 B1
(45) Date of Patent: Sep. 24, 2002

(54) METHOD AND SYSTEM FOR SELECTING AND USING SOURCE OPERANDS IN COMPUTER SYSTEM INSTRUCTIONS

(75) Inventors: Chih-Jui Peng, San Jose, CA (US); Glenn Ashley Farrall, Bristol (GB); Sivaram Krishnan, Los Altos, CA (US)

(73) Assignee: Hitachi LTD, Tokyo (JP)

( * ) Notice: Subject to any disclaimer, the term of this patent is extended or adjusted under 35 U.S.C. 154(b) by 0 days.

(21) Appl. No.: 09/410,549

(22) Filed: Oct. 1, 1999

(51) Int. Cl.⁷ .................................. G06F 9/38
(52) U.S. Cl. ................ 712/226; 712/208; 712/213; 712/216
(58) Field of Search ................ 712/216, 217, 712/208, 210, 213, 226

(56) References Cited

U.S. PATENT DOCUMENTS

| | | | |
|---|---|---|---|
| 4,306,285 A | * 12/1981 | Moriya et al. | ............. 712/226 |
| 4,814,981 A | 3/1989 | Rubinfeld | |
| 5,251,311 A | 10/1993 | Kasai | |
| 5,386,565 A | 1/1995 | Tanaka et al. | |
| 5,423,050 A | 6/1995 | Taylor et al. | |
| 5,434,804 A | 7/1995 | Bock et al. | |
| 5,440,705 A | 8/1995 | Wang et al. | |
| 5,448,576 A | 9/1995 | Russell | |
| 5,452,432 A | 9/1995 | Macachor | |
| 5,455,936 A | 10/1995 | Maemura | |
| 5,479,652 A | 12/1995 | Dreyer et al. | |
| 5,483,518 A | 1/1996 | Whetsel | |
| 5,488,688 A | 1/1996 | Gonzales et al. | |
| 5,530,965 A | 6/1996 | Kawasaki et al. | .......... 395/800 |
| 5,570,375 A | 10/1996 | Tsai et al. | |
| 5,590,354 A | 12/1996 | Klapproth et al. | |
| 5,596,734 A | 1/1997 | Ferra | |
| 5,598,551 A | 1/1997 | Barajas et al. | |

(List continued on next page.)

FOREIGN PATENT DOCUMENTS

| | | | |
|---|---|---|---|
| EP | 165 600 | 11/1991 | |
| EP | 636 976 | 2/1995 | |
| EP | 652 516 | 5/1995 | |
| EP | 702 239 | 3/1996 | |
| EP | 720 092 | 7/1996 | |
| EP | 933 926 | 8/1999 | |
| EP | 945 805 | 9/1999 | |
| EP | 959 411 | 11/1999 | |
| JP | 8320796 A | 12/1996 | ............. G06F/9/46 |
| JP | 8329687 A | 12/1996 | ............ G11C/15/00 |
| JP | 9212358 A | 8/1997 | ............. G06F/9/38 |
| JP | 9311786 A | 12/1997 | ............. G06F/9/38 |
| JP | WO 98/13759 | 4/1998 | |
| JP | 10106269 A | 4/1998 | ......... G11C/11/413 |
| JP | 10124484 | 5/1998 | ............ G06F/17/10 |
| JP | 10177520 A | 6/1998 | ............ G06F/12/10 |
| WO | WO98/13759 | 4/1998 | |

OTHER PUBLICATIONS

Richard York; Real Time Debug for System–on–Chip Devices; Jun. 1999; pp. 1–6.

*Primary Examiner*—William M. Treat
(74) *Attorney, Agent, or Firm*—Townsend and Townsend and Crew LLP

(57) ABSTRACT

According to the present invention, techniques for setting selected operand fields in pipelined architectures are provided. Methods and systems for efficiently selecting operand fields according to the present invention can be operative on a variety of computer architectures, including RISC architectures.

16 Claims, 4 Drawing Sheets

U.S. PATENT DOCUMENTS

| | | | | |
|---|---|---|---|---|
| 5,608,881 | A | 3/1997 | Masumura et al. | 395/306 |
| 5,613,153 | A | 3/1997 | Arimilli et al. | |
| 5,627,842 | A | 5/1997 | Brown et al. | |
| 5,657,273 | A | 8/1997 | Ayukawa et al. | 365/189.01 |
| 5,682,545 | A | 10/1997 | Kawasaki et al. | 395/800 |
| 5,682,546 | A * | 10/1997 | Garg et al. | 712/23 |
| 5,704,034 | A | 12/1997 | Circello | |
| 5,708,773 | A | 1/1998 | Jeppesen, III et al. | |
| 5,724,549 | A | 3/1998 | Selgas et al. | |
| 5,737,516 | A | 4/1998 | Circello et al. | |
| 5,751,621 | A | 5/1998 | Arakawa | 364/748.07 |
| 5,768,152 | A | 6/1998 | Battaline et al. | |
| 5,771,240 | A | 6/1998 | Tobin et al. | |
| 5,774,701 | A | 6/1998 | Matsui et al. | 395/556 |
| 5,778,237 | A | 7/1998 | Yamamoto et al. | 395/750.04 |
| 5,781,558 | A | 7/1998 | Inglis et al. | |
| 5,796,978 | A | 8/1998 | Yoshioka et al. | 395/416 |
| 5,828,825 | A | 10/1998 | Eskandari et al. | |
| 5,832,248 | A | 11/1998 | Kishi et al. | 395/376 |
| 5,835,963 | A | 11/1998 | Yoshioka et al. | 711/207 |
| 5,848,247 | A | 12/1998 | Matsui et al. | 395/284 |
| 5,860,127 | A | 1/1999 | Shimzaki et al. | 711/167 |
| 5,862,387 | A | 1/1999 | Songer et al. | |
| 5,867,726 | A | 2/1999 | Ohsuga et al. | 395/800.32 |
| 5,884,092 | A | 3/1999 | Kiuchi et al. | 395/800.35 |
| 5,896,550 | A | 4/1999 | Wehunt et al. | |
| 5,918,045 | A | 6/1999 | Nishii | 395/584 |
| 5,930,523 | A | 7/1999 | Kawasaki et al. | 395/800.32 |
| 5,930,833 | A | 7/1999 | Yoshioka et al. | 711/210 |
| 5,944,841 | A | 8/1999 | Christie | |
| 5,950,012 | A | 9/1999 | Shiell et al. | |
| 5,953,538 | A | 9/1999 | Duncan et al. | |
| 5,956,477 | A | 9/1999 | Ranson et al. | |
| 5,978,874 | A | 11/1999 | Singhal et al. | |
| 5,978,902 | A | 11/1999 | Mann | |
| 5,983,017 | A | 11/1999 | Kemp et al. | |
| 5,983,379 | A | 11/1999 | Warren | |
| 6,023,757 | A | 2/2000 | Nishimoto et al. | |
| 6,038,582 | A | 3/2000 | Arakawa et al. | |
| 6,038,661 | A | 3/2000 | Yoshioka et al. | |
| 6,091,629 | A | 7/2000 | Osada et al. | |
| 6,092,172 | A | 7/2000 | Nishimoto et al. | |
| 6,243,732 | B1 | 6/2001 | Arakawa et al. | |

* cited by examiner

Note: LSU Result goes to the IMU where it is muxed with the multiplier result to form the overall imu_result_ex3. 32/64 bit busses running between blocks

METHOD AND SYSTEM FOR SELECTING AND USING SOURCE OPERANDS IN COMPUTER SYSTEM INSTRUCTIONS

CROSS-REFERENCES TO RELATED APPLICATIONS

The following applications, including this one, are being filed concurrently, and the disclosure of the other applications are incorporated by reference into this application in their entirety for all purposes:

U.S. patent application Ser. No. 09/410,633, entitled "AN INTEGER INSTRUCTION SET ARCHITECTURE AND IMPLEMENTATION";

U.S. patent application Ser. No. 09/690,340, entitled "A METHOD FOR LOADING AND STORING DATA IN A COMPUTER SYSTEM";

U.S. patent application Ser. No. 09/411,600, entitled "A FLOATING POINT INSTRUCTION SET ARCHITECTURE AND IMPLEMENTATION".

U.S. patent application Ser. No. 09,410,675, entitled "A METHOD FOR ENCODING COMPUTER INSTRUCTION DATA FIELD".

BACKGROUND OF THE INVENTION

The present invention relates generally to computer instruction set architectures, and particularly to the setting of selected operand fields.

In the past decade RISC (Reduced Instruction Set Computer) architectures, in which each instruction is ideally performed in a single operational cycle, have become popular. RISC architecture computers present several advantages over standard architecture computers. For instance, RISC instruction sets are capable of much higher data processing speeds due to their ability to perform frequent operations in shorter periods of time. The RISC devices began with 16-bit instruction sets, and grew to 32-bit instruction set architectures.

Pipelining techniques have been used in conjunction with RISC architectures to increase data throughput. Pipelining brought the need for data dependency checking; where the output of one instruction is the expected input into a following instruction. In some cases, instructions are divided into monadic (single source) and dyadic (dual source) instructions, each having its own unique dependency logic.

In addition to the complexities introduced by pipelining, applications have also contributed to the increasing complexity of RISC architectures. Frequently used constants, such as zero, can be set in different places from different sources.

Thus there is need for simplifying dependency logic without adding additional complexities to the hardware. In addition, there is a need to have a centralized, known source for zero to simplify the use of this frequently accessed constant.

SUMMARY OF THE INVENTION

According to the present invention, techniques for setting selected operand fields in pipelined architectures are provided. Methods and systems for efficiently selecting operand fields according to the present invention can be operative on a variety of computer architectures, including RISC architectures.

In a specific embodiment, the present invention provides a method for performing dependency checking on computer instructions in a pipeline of a computer system including determining if a first computer instruction has an opcode operating on only a first source operand. The computer instruction can have an opcode and a plurality of source operands, for example. Next, additional source operands can be replaced with the first source operand or the constant zero operand. Dependencies can be detected between the operands in the computer instruction and operands in other computer instructions in the pipeline. In a present embodiment, detecting can use the dyadic dependency checking for monadic instructions.

In another embodiment, the present invention provides a computer system for executing a computer instruction in a pipeline. The system can include a memory containing the computer instruction. The computer instruction can have a plurality of data fields, for example. A register that can return all zeros and a computer processor for executing the computer instruction stored in memory can also be part of the computer system. In a presently preferable embodiment, the register can be a 64-bit read only register, for example. The computer system can place one operand into the register while executing the computer instruction, for example.

Numerous advantages are provided by select embodiments according to the present invention. Embodiments can provide for setting selected operand fields in pipelined instructions for select computer architectures. In some embodiments, dependency checking for pipelined instructions can be provided. Many embodiments can be operable with RISC type computer architectures. Select embodiments can provide a standard hardware source for frequently used constant values and the like.

These and other advantages and features of the present invention will become apparent to those skilled in this art upon a reading of the following detailed description, which should be taken in conjunction with the accompanying drawings.

DESCRIPTION OF THE SPECIFIC EMBODIMENTS

Embodiments according to the present invention can provide techniques for setting selected operand fields in pipelined architectures. Methods and systems for efficiently selecting operand fields according to the present invention can be operative on a variety of computer architectures, including RISC architectures.

Figure 1:
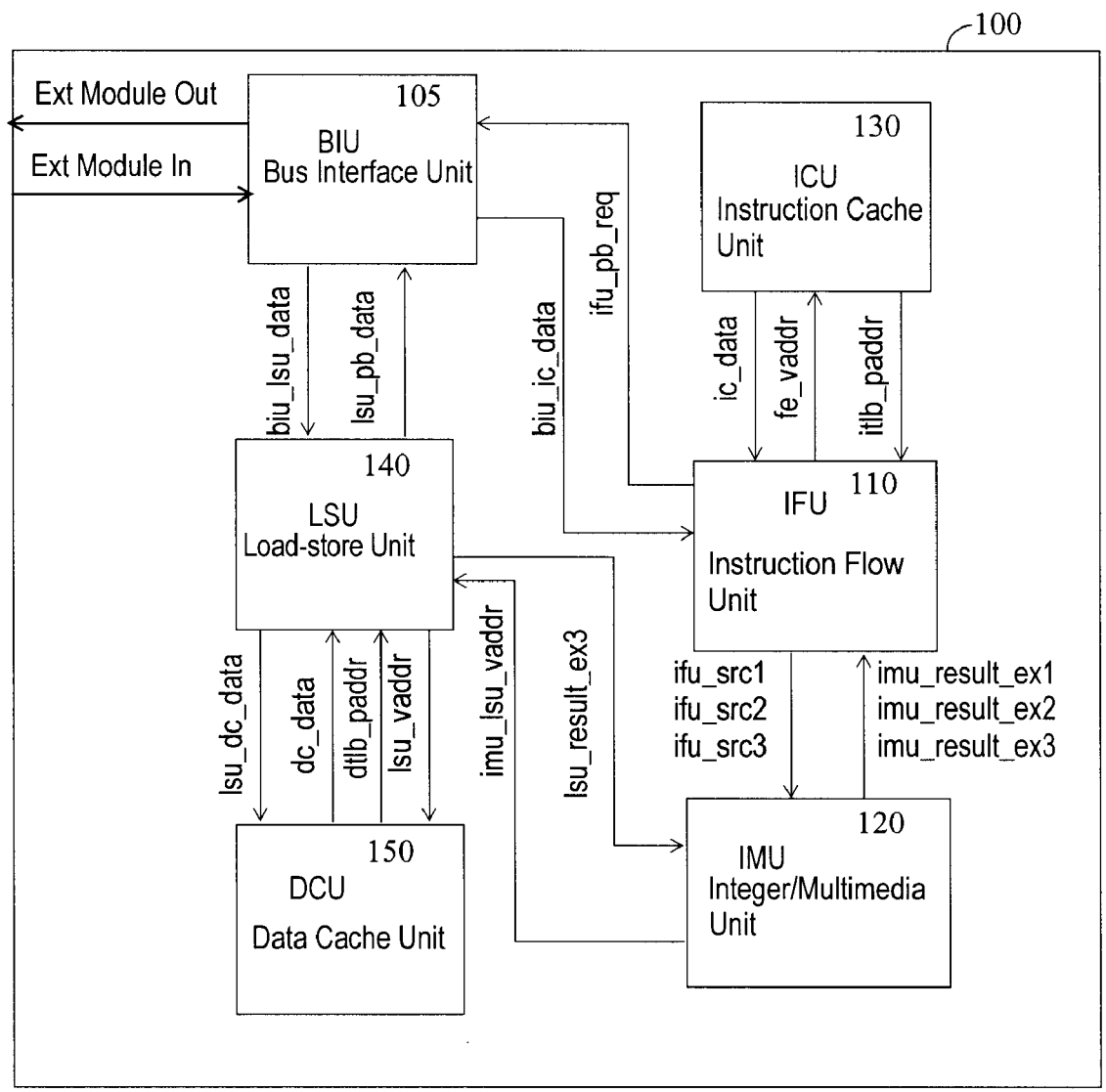
FIG. 1 illustrates a simplified block diagram of a representative top level partitioning of a core in a specific embodiment of the present invention.

In a specific embodiment, the present invention may be implemented in a CPU having a core unit which may include six units and a detachable Floating-Point Unit (FPU). FIG. 1 illustrates simplified block diagram of a representative top level partitioning of a core of the present invention. This diagram is merely an example which should not limit the scope of the claims herein. One of ordinary skill in the art would recognize many other variations, alternatives, and modifications. Table 1 describes some of the functions of the units illustrated in core 100 of FIG. 1.

TABLE 1

| Unit | Acronym | Description |
| --- | --- | --- |
| S5 Core 200 | S5 | Top level core block |
| Bus interface unit 205 | BIU | Controls bus access to external modules such as peripheral modules and external memory interface. |
| Instruction Flow Unit 210 | IFU | The front end of the CPU pipe: fetch, decode, issue & branch. Also contains mode B emulation. |
| Instruction multimedia unit 220 | IMU | Handles all integer and multimedia instructions. The main CPU datapath. |
| Instruction cache Unit 230 | ICU | Comprises the Instruction Cache and the Instruction Translation Lookaside Buffer (TLB) |
| Load Store Unit 240 | LSU | Handles all memory instructions and Data cache control. |
| Data cache Unit 250 | DCU | Comprises the Data Cache and the Data Translation Lookaside Buffer (TLB) |
| Floating Point Unit 265 | FPU | Detachable Floating point unit (not shown in FIG. 1). |

Figure 2:
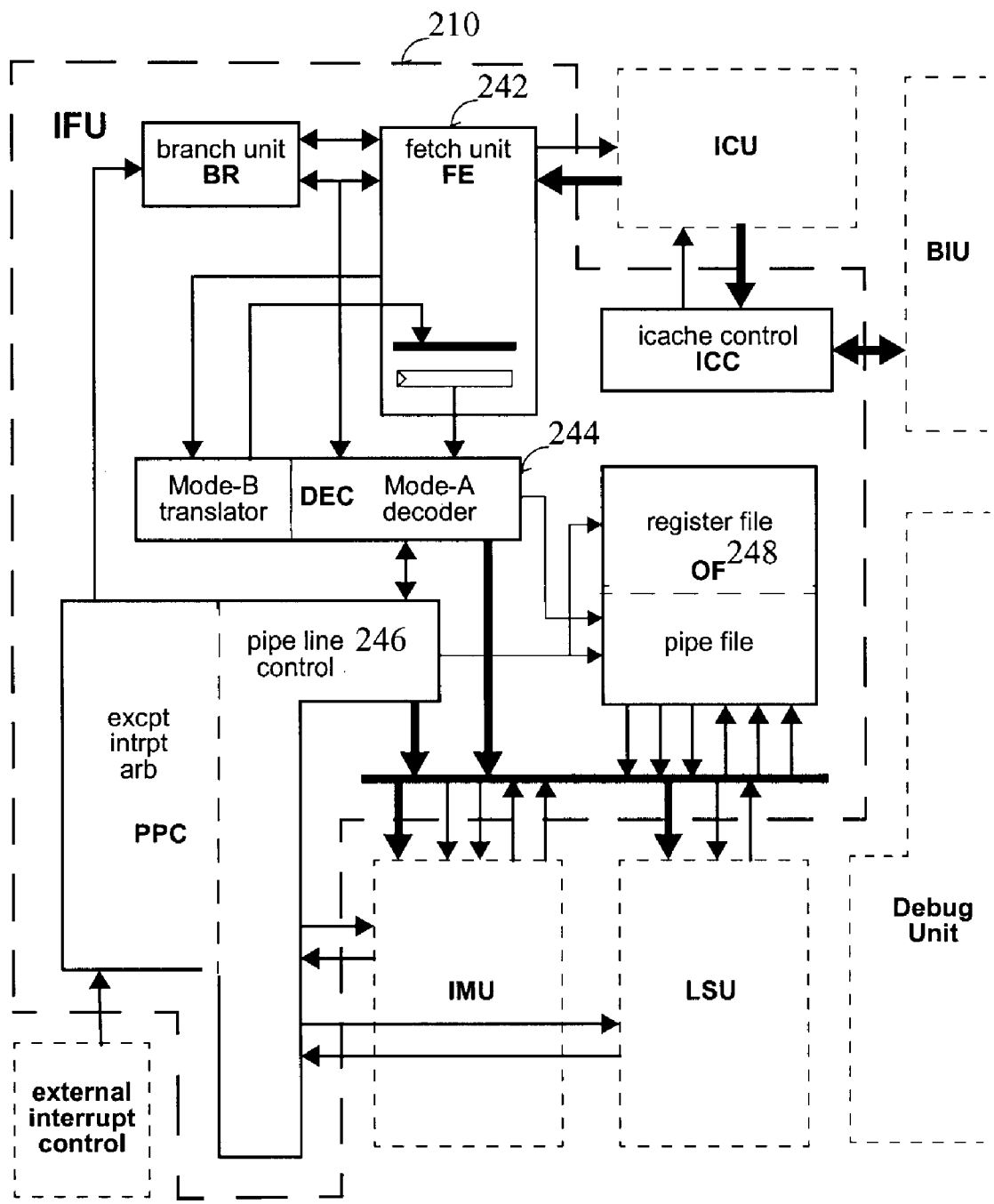
FIG. 2 illustrates a simplified block diagram of a representative Instruction Flow Unit in a specific embodiment of the present invention.

FIG. 2 illustrates a simplified block diagram of an Instruction Fetch Unit (IFU) 210 in a specific embodiment of the present invention. This diagram is merely an example which should not limit the scope of the claims herein. One of ordinary skill in the art would recognize many other variations, alternatives, and modifications. FIG. 2 illustrates instructions entering a Fetch Unit (FE) 242 from an Instruction Cache Unit (ICU) 130. A Decoder (DEC) 244 can identify logical locations of the source and destination operands. Logical locations can include general-purpose register, floating-point register, target address register, control register, embedded immediate constant, the PC, and the like. Decoder 244 can pass its identification information to a Pipeline Control Unit (PPC) 246 that can select the proper source operands from the instructions. The Pipeline Control Unit 246 can also monitor the execution of the instruction through other stages of the instruction pipeline. PPC 246 can ensure that instructions are executed smoothly and correctly, for example. Instructions may be held in the decode stage until all the source operands are ready or can be ready when needed for execution of the instruction. An Operand File (OF) 248 can comprise source registers, i.e., General Purpose Registers (GPR's). Further reference may be had to Appendix 1 for a detailed description of a specific embodiment of IFU 210.

Figure 3:
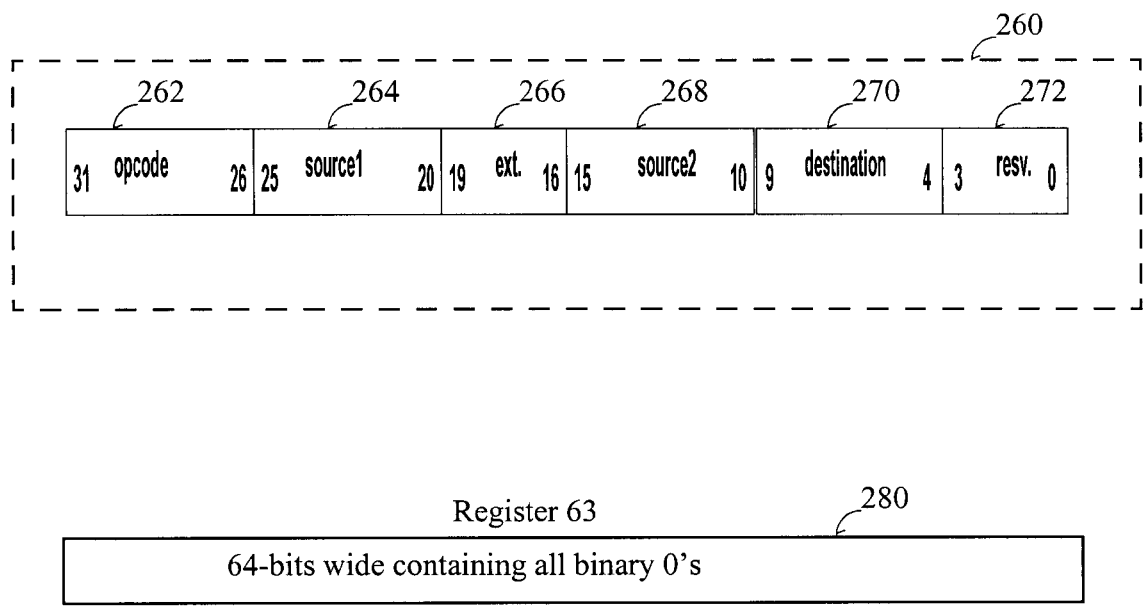
FIG. 3 illustrates a simplified diagram of a representative computer instruction format in a specific embodiment of the present invention.

FIG. 3 illustrates a simplified diagram of a representative example computer instruction format 260 in a specific embodiment of the present invention. This diagram is merely an example which should not limit the scope of the claims herein. One of ordinary skill in the art would recognize many other variations, alternatives, and modifications. Instruction format 260 is an example of a dyadic instruction including an opcode 262, a register source1 264, a register source2 268, and a destination register 270. Optionally, an extension 266 to opcode 262 and reserved bits 272 may be provided. In alternative embodiments, source2 268 can be replaced by a 6-bit immediate address. Extension 266 and source2 268 can be replaced with a 10-bit immediate address. Source1 264, extension 266, and source2 268 can be replaced with a 16-bit immediate address. FIG. 3 also illustrates a general purpose register 63 (GPR63) 280 which can be a read-only register storing value zero. Any of the source registers 264, 268 or the destination register 270 can be set to GPR63.

In a specific embodiment of the present invention, there are two general categories of instructions: the floating-point instructions (or FP instructions) and the rest integer, multimedia, load/store, flow-control instructions (or simply integer instructions). The former operates on floating-point registers, which do not have a constant register, while the later operates on, among others, the general-purpose registers, which has a constant-zero register R63. For FP instructions, all un-used 2nd source operand specifiers, i.e., the contents of the field in the instruction identifying the 2nd source register, may be encoded the same as the 1st source operand specifier so that a generic dependency checking logic can be used to detect instruction dependencies without knowing whether the instruction is monadic or dyadic. For integer instructions, all un-used 2nd source operand specifiers may be encoded as binary "63." This is because R63 as a constant register has no read-after-write dependency. There can be no writing into R63 and then reading from it. Since this property is true for both monadic and dyadic instructions, forcing all un-used 2nd operand specifiers to be encoded as 63 allows us to use a generic dependency checker on the integer side to check for read-after-write dependencies.

In one representative example, general purpose register 63 (GPR63) is used by the instruction PTABS. The PTABS instruction, Table 2, gives a target address specified by the source register Rn. The target address is stored in the target address register TRa. The reserved bits 20–25 may be implemented as "111111" or 63. Thus the hardware for a dyadic dependency checker for read-after write dependencies may be used on PTABS, a monadic instruction.

TABLE 2

PTABS

| 011010 | r | 0001 | n | 1 | r | a | r |
| --- | --- | --- | --- | --- | --- | --- | --- |
| 31   26 | 25  20 | 19  16 | 15  10 | 9 | 8 7 | 6  4 | 3  0 |

PTABS Rn, TRa address ← ZeroExtend64(Rn);
target ← address;
TRa ← Register(target);

In another representative example, general purpose register 63 (GPR63) is used by the instruction GETTR. This instruction sign-extends a 32-bit target register (TR) into a 64-bit value. Table 3 illustrates a format for a GETTR instruction in a particular embodiment according to the present invention. Execution of a GETTR instruction, moves the value held in a target address register $TR_b$ into a general register $R_d$. The value returned by GETTR ensures that any unimplemented high-order bits of the source target register are seen as sign extensions of the highest implemented bit. Table 3 illustrates a machine code representation of the instruction, followed by an assembly language mnemonic. Next is shown the functional algorithm, which may be implemented in software, hardware, or both.

TABLE 3

| 010001 | r | b | 0101 | r | d | r |
|---|---|---|---|---|---|---|
| 31 | 26 25 | | 20 19 | 16 15 | 10 9 | 4 3 0 |

| GETTR TRb, Rd |
|---|
| source1[63:0] ← ZeroExtend32(TRb[31:0]);<br>source2[63:0] ← R63[63:0];<br>result[63:0] ← SignExtend32(source1[63:0] + source2[63:0]);<br>Rd[63:0] ← result[63:0]; |

Table 3 illustrates an implementation of the GETTR instruction described in Table 2. In the specific embodiment of Table 3, the GETTR instruction is implemented as an ADD.L with the 2nd operand (Rn=63) being 0 to get the sign-extension. During execution of the ADD.L instruction, the low 32 bits of Rm are added to the low 32 bits of Rn. The sign-extended 32-bit result can be stored in Rd. Thus by having the 2nd source operand specifier, Rn, encoded as 63, the 32-bit sign-extension operation for a monadic instruction, such as GETTR, can be implemented with the same circuit that implements the addition then sign-extension operation for a dyadic instruction, such as ADD.L.

TABLE 4

| 000000 | m | 1000 | n | d | r |
|---|---|---|---|---|---|
| 31 | 26 25 | 20 19 | 16 15 | 10 9 | 4 3 0 |

| ADD.L Rm, Rn, Rd |
|---|
| source1[63:0] ← Rm[63:0];<br>source2[63:0] ← Rn[63:0];<br>result[63:0] ← SignExtend32(source1[63:0] + source2[63:0]);<br>Rd[63:0] ← result[63:0]; |

In some embodiments, GPR63 can be a read-only register always having all zeroes stored in it. During hazard detection, PPC 246 can check if the current instruction has R63 as a destination. If this is the case, PPC 246 marks the instruction as a non-valid destination. In this way, subsequent instructions may never find hazards on Register 63 and it is read from the register file. This may be further explained, since R63 is a constant register, designating R63 as the target register can not (i) change the value of R63, and (ii) cause dependencies from subsequent instructions that use R63 as a source operand. The specific embodiment of the architecture takes advantage of this property and uses it to provide a prefetch hint to the cache. For example, when a Load instruction is decoded, the IFU checks if the target register is R63 (this logic already exists for the dependency checking). If the target register is R63, the LSU is informed that this is a cache hint and the result will not be used so that the LSU does not need to stall the pipeline if the operand can not be found in the cache. In addition, the LSU will not raise any exception if the load address is bad. Since R63 can not be written into, the load (into R63) will proceed down the pipeline like a NOP except that the cache control is informed to load the operand into the cache if it is not already there.

Figure 4:
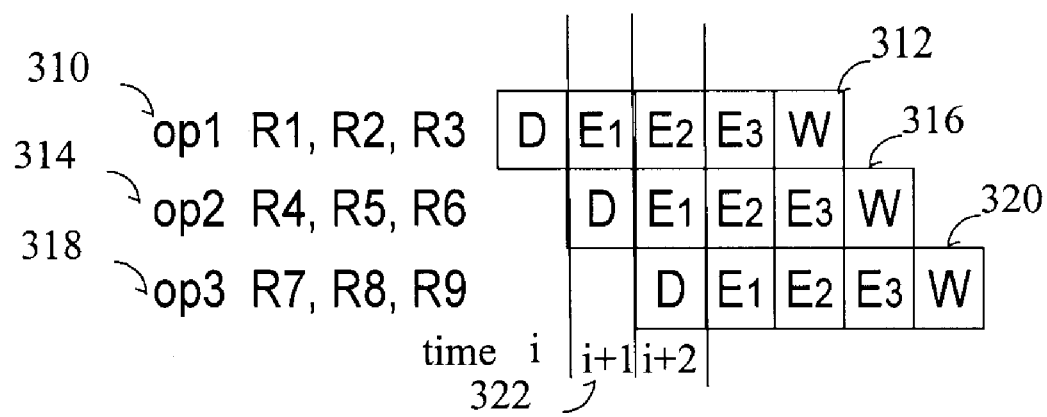
FIG. 4A illustrates a simplified diagram of a representative pipeline with no data dependency between instructions in a specific embodiment according to the present invention.
FIG. 4B illustrates a simplified diagram of a representative pipeline with data dependencies in a specific embodiment of the present invention.
FIG. 4C illustrates a simplified diagram of a representative pipeline with data dependencies causing a stall in a specific embodiment of the present invention.
Figure 4:
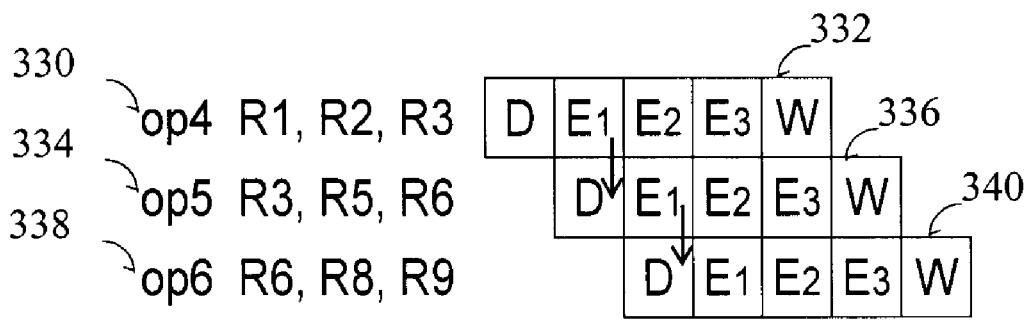
Figure 4:
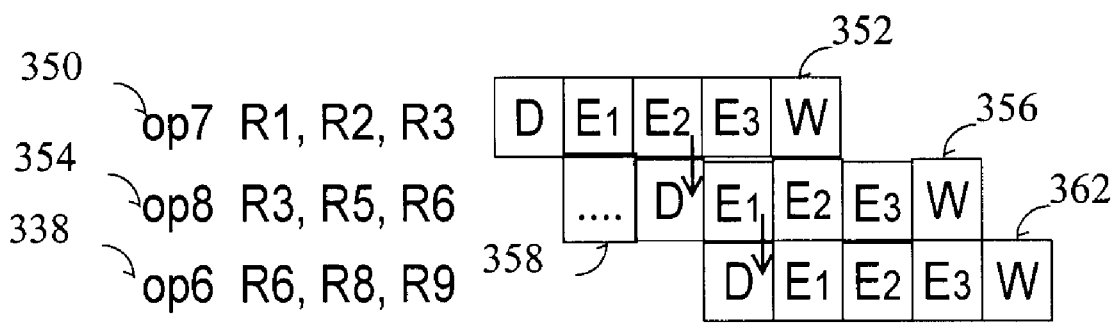

FIG. 4A shows a pipeline with no data dependency between instructions op1 310, op2 314, and op3 318. This diagram is merely an example which should not limit the scope of the claims herein. One of ordinary skill in the art would recognize many other variations, alternatives, and modifications. FIG. 4A illustrates instruction op1 310 having an opcode, op1, followed by, R1, a position of the first source register (264 in FIG. 3), R2, the position of the second source register (268 in FIG. 3), and R3, the position of the destination register (270 in FIG. 3). The execution timeline 312 illustrates the execution cycle for instruction 310 having op1. Execution timeline 312 has a decode stage, D, and a write stage, W. There are three execution stages in 312, E1, E2, and E3. The next instruction 314 is executed as shown by execution timeline 316. Comparing execution timeline 316 with execution timeline 312, it can be seen that instruction 314 can be decoded, D of 316, while instruction 310 is in execution stage E1 of 312. The arrangement of decode stages (D) in execution timelines 312, 316 and 320 illustrates that a new instruction can be decoded in times i, i+1, and i+2, where each vertical arrangement of blocks in execution timelines 312, 316 and 320, represents the same time cycle. For example at time "i+1" 322, execution cycle 312 is in the E1 stage and execution cycle 316 is in the D stage.

FIG. 4B illustrates simplified diagram of a representative pipeline with data dependencies in a specific embodiment of the present invention. This diagram is merely an example which should not limit the scope of the claims herein. One of ordinary skill in the art would recognize many other variations, alternatives, and modifications. FIG. 4B illustrates a first instruction 330 having an opcode op4 and a destination register R3. Destination register R3 is used as a source in subsequent instruction 334, having opcode op5. If the destination data can be produced in one cycle for instruction 330 (op4), then execution timeline 332 shows that at E1, the data is available to the decode cycle, D, of execution timeline 336 for subsequent instruction 334. Similarly, the result of instruction 334 (op5) is produced by execution stage E1 depicted by execution timeline 336. This result is passed to decode stage D, of instruction 338 (op6) illustrated by execution timeline 340.

FIG. 4C illustrates a simplified diagram of a representative pipeline with data dependencies causing a stall in a specific embodiment of the present invention. This diagram is merely an example which should not limit the scope of the claims herein. One of ordinary skill in the art would recognize many other variations, alternatives, and modifications. In this example, instruction 350 (op7) takes two execution cycles E1, E2 after decode stage D, as illustrated by execution timeline 352. The R3 result of instruction 350 is used as an input to instruction 354 (op8). Therefore, the PPC "stalls" one cycle 358 in execution timeline 356, in order to obtain the correct value of R3 from processing of instruction 350 (op7). As instruction 360 (op6) uses result R6 of instruction 354 (op8), processing of this instruction is also delayed, as indicated by execution timeline 362. Thus, in order to prevent a hazard, there may be a data dependency check between the result register R3 of instruction 350 (op7) and the two input source registers R3 and R5 of instruction 354 (op8). Both sources from instruction 354 (op8) may need to be checked, as both source values are required to compute the result R6 of the instruction.

In a specific embodiment of the present invention, monadic instructions may have a format such as format of 260 of FIG. 3, with one source register 264 or 268 left unused. If the unused source register were set to be equal to the used source register, then the dependency pipeline diagram illustrated in FIG. 4C could be used. There would not be a need for a separate monadic dependency checking circuit.

An example of a monadic instruction with a dyadic format in a specific embodiment of the present invention is the FABS.D instruction. Table 5 illustrates instruction FABS.D, which computes the absolute value of a double-precision floating-point number. It reads the value of DRg, clears its sign bit and stores the result in DRf. The second source register is represented by reserved bits 10–15 or "r1."

TABLE 5

| 000110 | g | 1101 | r1 | f | r |
|---|---|---|---|---|---|
| 31 | 26 25 | 20 19 | 16 15 | 10 9 | 4 3 0 |

FABS.D DRg, DRf source ← FloatValue64(DRg);
result ← FABS_D(source);
DRf ← FloatRegister64(result);

Thus setting "r1" in the above instruction to the value of the used source register, DRg, in FABS.D, would allow use of the dyadic dependency checking as described hereinabove with reference to FIG. 4C.

Another advantage of the replicated source operand in a monadic instruction may be that this gives more flexibility to the design. In a typical design there will be source operand buses that pass through the pipeline. The replicated source operand allows that source to be accessed on either the source1 or source2 bus to best suit the design. This leads to more flexibility in the physical layout of the design (it may be more physically convenient to take the operand from one bus rather than the other). Also, if the two buses are not equally utilized (i.e., one is loaded more heavily than the other), then the replicated source operand allows the less loaded bus to be used, hence equalizing their loading.

CONCLUSION

In the foregoing specification, the invention has been described with reference to specific exemplary embodiments thereof. Other embodiments will be apparent to those of ordinary skill in the art. For example, the instructions may be 16 or 64 or 128 bits or more in length, there may be three source operands of which only one is used (hence copied into the other operands), or the pipeline may contain more or less than three stages. Thus it is evident that various modifications and changes may be made thereunto without departing from the broader spirit and scope of the invention as set forth in the appended claims and their full scope of equivalents.

What is claimed is:

1. A method for performing dependency checking on instructions in a pipeline of a computer system, said pipeline containing a first instruction and subsequent instructions, said instructions comprising an opcode, a first source operand and a second source operand, said instructions comprising monadic instructions and dyadic instructions, said monadic instructions having an opcode that operates only on the first source operand, said dyadic instructions having an opcode that operates on the first source operand and the second source operand, said method comprising:

determining if said first instruction comprises a monadic instruction;
   if said first instruction comprises a monadic instruction, replacing said second source operand with a token; and
   detecting any dependencies between operands in said first instruction and operands in said subsequent instructions in said pipeline.

2. The method of claim 1 wherein said detecting further comprises:

performing dyadic dependency checking for said monadic instructions and said dyadic instructions.

3. The method of claim 1 wherein said token further comprises said first operand.

4. The method of claim 1 further comprising:

detecting whether said first instruction comprises a floating point instruction;
   if said first instruction comprises a floating point instruction, using said first operand as said token; otherwise using an integer value as said token.

5. The method of claim 4 further comprising:

detecting if a third operand comprises an integer value; and
   if a third operand comprises an integer value, providing a pre-fetch signal to the cache.

6. The method of claim 1 wherein said instructions comprise RISC instructions.

7. A computer system for executing instructions, said instructions comprising a first instruction and subsequent instructions, said instructions comprising an opcode, a first operand and subsequent operands, said instructions comprising monadic instructions and dyadic instructions, said monadic instructions having an opcode that operates only on a first operand, said dyadic instructions having an opcode that operates on a first operand and a second operand, said system comprising:

a memory, said memory holding said instructions;
   a processor, said processor operative to execute said instructions;
   a pipeline, said pipeline unit operative to control processing by said processor of said instructions retrieved from said memory; wherein said pipeline unit is operatively disposed to:
   determine if said first instruction comprises a monadic instruction;
   if said first instruction comprises a monadic instruction, replace said subsequent source operands with a token; and
   detect any dependencies between operands in said first instruction and operands in said subsequent instructions in said pipeline.

8. The system of claim 7 wherein said detecting further comprises:

performing dyadic dependency checking for said monadic instructions and said dyadic instructions.

9. The system of claim 7 wherein said token further comprises said first operand.

10. The system of claim 7, wherein said pipeline unit is further operative to:

detect whether said first instruction comprises a floating point instruction;
   if said first instruction comprises a floating point instruction, use said subsequent source operands as said token; otherwise use an integer value as said token.

11. The system of claim 7 wherein said instructions comprise RISC instructions.

12. The system of claim 7 further comprising:

a 64-bit register which is read-only and returns all zeros.

13. The system of claim 7 wherein said processor is a 64-bit computer processor for executing the instruction stored in memory; wherein said executing comprises one data field using said 64-bit register.

14. The computer system of claim 12 wherein said pipeline unit marks said 64-bit register if said 64-bit register is a destination register in said instruction.

15. A method for performing dependency checking on computer instructions in a pipeline of a computer system comprising:

- determining if a first computer instruction, comprising an opcode and a plurality of source operands, has the opcode operating on only a first source operand;
- replacing a unused operand with the first source operand; and
- detecting any dependencies between the operands in the first computer instruction and operands in another computer instruction in the pipeline by performing dyadic dependency checking using the unused operand and first source operand.

16. A method for performing dependency checking on computer instructions in a pipeline of a computer system comprising:

- determining if a first computer instruction, comprising an opcode and a plurality of source operands, has the opcode operating on only a first source operand;
- replacing a unused operand with a special operand, wherein the special operand references a read-only register comprising zeros; and
- detecting any dependencies between the operands in the first computer instruction and operands in another computer instruction in the pipeline by performing dyadic dependency checking using the unused operand and first source operand.

* * * * *